United States Patent
Maeda

[11] Patent Number: 6,107,771
[45] Date of Patent: Aug. 22, 2000

[54] MOVE COMMAND CORRECTION METHOD AND SERVO CONTROL SYSTEM WITH CORRECTION OF MOVE COMMAND

[75] Inventor: Kazuomi Maeda, Kamoto-gun, Japan

[73] Assignee: Fanuc Ltd., Yamanashi, Japan

[21] Appl. No.: 09/194,064

[22] PCT Filed: Mar. 23, 1998

[86] PCT No.: PCT/JP98/01242

§ 371 Date: Nov. 20, 1998

§ 102(e) Date: Nov. 20, 1998

[87] PCT Pub. No.: WO98/43139

PCT Pub. Date: Oct. 1, 1998

[30] Foreign Application Priority Data

Mar. 21, 1997 [JP] Japan .................................. 9-087537

[51] Int. Cl.$^7$ .................. G05B 19/404; G05D 3/12
[52] U.S. Cl. .................. 318/630; 318/600; 318/632
[58] Field of Search ................. 318/568.22, 600, 318/601, 603, 621, 630, 632

[56] References Cited

U.S. PATENT DOCUMENTS

| | | | |
|---|---|---|---|
| 4,128,794 | 12/1978 | Burleson | 318/603 |
| 4,251,761 | 2/1981 | Inoue | 318/630 |
| 4,504,917 | 3/1985 | Grimm et al. | 364/474.35 |
| 4,916,375 | 4/1990 | Kurakake et al. | 318/630 |
| 5,204,602 | 4/1993 | Iwashita | 318/630 |
| 5,329,215 | 7/1994 | Fraser et al. | 318/603 |
| 5,691,616 | 11/1997 | Iwashita | 318/615 |

FOREIGN PATENT DOCUMENTS

| | | |
|---|---|---|
| 54-132090 | 10/1979 | Japan . |
| 63-174848 | 7/1988 | Japan . |
| 2-239303 | 9/1990 | Japan . |
| 2-307104 | 12/1990 | Japan . |
| 4-36807 | 2/1992 | Japan . |
| 8-95625 | 4/1996 | Japan . |
| 8-263117 | 10/1996 | Japan . |

*Primary Examiner*—Bentsu Ro
*Attorney, Agent, or Firm*—Staas & Halsey, LLP

[57] ABSTRACT

An amount of difference between a commanded position and an actual position resulting from reversing a direction of movement is found before machining and is stored in a memory of a positional difference controller (9). Then, a move command Pc is monitored in the process of machining as to whether or not a sign of the move command is reversed, and the amount of difference is added to the move command to correct a move command value when the reversion of the sign is detected. Then, position/speed/current control (3) is performed on the basis of a difference between the corrected move command value and position feedback Pf from a servo motor (5), that is, a corrected positional deviation Er, and the servo motor (5) is driven.

11 Claims, 9 Drawing Sheets

MOVE COMMAND CORRECTION METHOD AND SERVO CONTROL SYSTEM WITH CORRECTION OF MOVE COMMAND

FIELD OF THE INVENTION

This invention relates to correction of move command for reducing the difference between a commanded position and an actual position occurring when reversing the move command in a servo control system to control a machine tool. More particularly, the present invention relates to a move command correction suitable for repetitive machining in the same condition.

DESCRIPTION OF THE RELATED ART

In case of repetitive machining in the same condition, learning control (repetitive control) effective in realizing highly-accurate machining by making use of repetition of a machining command has been heretofore known, as disclosed in Japanese Patent Publications such as Japanese Patent Laid-open Nos. Hei 4-323705 and Hei 6-309021, for instance.

Figure 2:
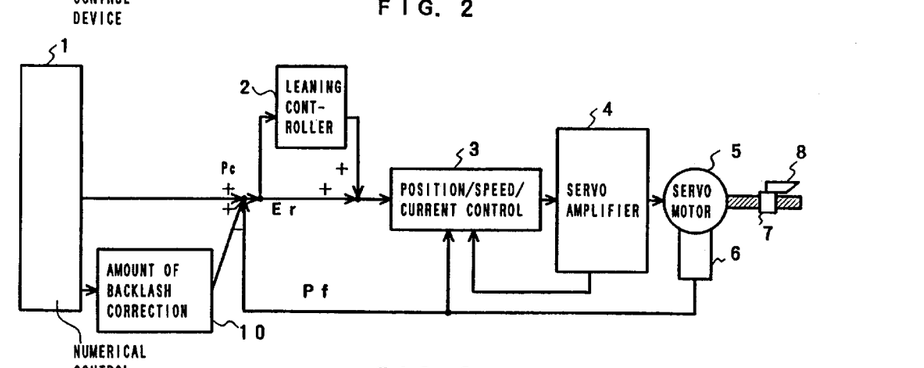
FIG. 2 is a functional block diagram showing a servo control system in a semi-closed loop mode which performs also learning control heretofore in use.

FIG. 2 shows a servo control system in a semiclosed loop mode which performs the learning control. This servo control system finds a positional deviation by subtracting an amount of positional feedback Pf, outputted from a position/speed detector 6 mounted on a servo motor 5, from a move command Pc, issued from a numerical control device 1, adds an amount of correction found by a learning controller 2 to the positional deviation and delivers the sum into a position/speed/current controller 3.

The position/speed/current controller 3 finds a speed command by multiplying the sum of the positional deviation and the amount of correction by a positional gain, finds a speed deviation by subtracting a speed feedback value, detected and fed back by the position/speed detector 6, from the speed command, finds a torque command (a current command) through proportional integral control or the like, further performs current feedback control on the basis of current fed back from a current detector provided in a servo amplifier 4, and applies current to the servo motor 5 through the servo amplifier 4 composed of a transistor inverter or the like to drive the servo motor 5.

The servo motor 5 converts a revolving motion into a linear motion with a ball screw/nut mechanism 7 to drive a table mounted with a work or a tool. FIG. 2 shows an instance of driving a tool 8 with the ball screw/nut mechanism 7.

The learning controller 2 is composed of a delay element memory stored with data for one cycle portion (i.e., for n-sampling cycle portion) of the move command Pc, issued repeatedly in a predetermined cycle according to the same pattern, and a dynamic characteristic compensation element. Then, the data resulting from adding the data stored in the delay element memory, i.e., data precedent to a current cycle by one cycle to the positional deviation, is stored in the delay element memory after undergoing filter processing. Further, the data precedent to the current cycle by one cycle is outputted as an amount of correction from the learning controller 2 through the delay element memory after having been compensated for a phase delay of a control object and a reduction in gain by the dynamic characteristic compensation element. This amount of correction is added to the positional deviation to correct the positional deviation, and the corrected positional deviation is transferred to a speed control loop.

In case of applying the learning control to the servo control system in the semi-closed loop mode as described above, a rotation position of the servo motor 5 is corrected through the learning control so as to track more accurately the move command Pc issued from the numerical control device 1, so that servo motor 5 can be driven accurately according to the move position.

However, backlash occurs in the ball screw/nut mechanism 7, and so when a sign of the move command is reversed, that is, the revolving direction of the servo motor 5 is reversed, the table or the tool 8 which moves linearly by the ball screw/nut mechanism 7 stops an amount corresponding to a backlash so that it does not follow up the move command Pc. A follow-up delay caused by backlash cannot be compensated by the learning control.

Such backlash has been heretofore corrected according to a method, wherein the numerical control device 1 checks, in case of issuing the move command Pc to the servo control system according to a machining program or in response to a feed signal, whether or not a direction of movement is reversed, and issues a predetermined amount of backlash correction 10 together with the move command Pc when the direction of movement is reversed, and the servo control system adds the amount of backlash correction to the move command Pc to eliminate the follow-up delay. The amount of backlash correction is determined according to the ball screw/nut mechanism 7 or the like of the corresponding axis, and the amount of backlash correction will not be varied in general.

Figure 3:
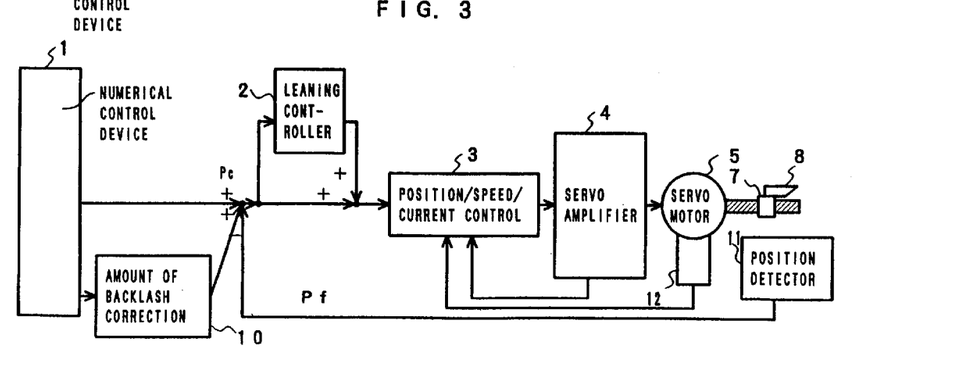
FIG. 3 is a functional block diagram showing a servo control system in a full-closed loop mode which performs also learning control heretofore in use.

When a servo control system is in a full-closed loop mode which performs positional feedback of the table or the tool 8 driven by the servo motor 5 by directly detecting the position of the table or the tool 8 with a position detector 11 as shown in FIG. 3, and is additionally equipped with the learning controller 2, the position of the table or the tool 8 can directly be controlled by feedback without being affected by backlash of the ball screw/nut mechanism 7, thereby providing a control system which follows up a commanded position accurately. Incidentally, reference numeral 12 in FIG. 3 denotes a speed detector to detect a revolving speed of the servo motor 5.

In the servo control system in the semi-closed loop shown in FIG. 2, in case where machining is performed at low speed, that is, the servo motor 5 is revolved at a low speed, the follow-up delay can be corrected by correcting backlash with the amount of backlash correction, resulting in highly-accurate machining. On the other hand, in case where a machining speed is increased to perform machining at high speed, this servo control system is affected by distortion or the like of the ball screw under the action of inertia when the turning direction of the ball screw is changed, resulting in an increase in difference between the commanded position and the actual position. This positional difference varies depending on machining conditions such as machining speed and hence cannot be corrected by any conventional correction method in which only the predetermined amount of backlash correction set for every machine is added to the positional deviation, so that, it is not possible to adequately improve machining accuracy.

In the case of machining such as that of a hollow work, the work is sometimes deflected due to the effect of cutting pressure applied from the tool in the process of machining. That is, the work, as it is hollow, may deflect when receiving the cutting pressure from the tool toward the center of the work. Besides, the cutting pressure varies depending on an advance direction of a cutting edge of the tool (depending on whether the tool is moved to thrust into the work or to escape from the work), and accordingly, the amount of pressure and the amount of deflection also vary. However, a machining error caused by deflection of the work as described above cannot be corrected with the conventional backlash correction by fixed amount or the like, resulting in degradation of machining accuracy.

In case of using the servo control system in the full-closed loop mode as shown in FIG. 3, the position of the tool or the table (the work) is detected directly, and so the influence of the backlash or the like of the ball screw can be eliminated, resulting in an improvement of machining accuracy. However, when the work may deflect due to the effect of cutting pressure like a case of machining of the hollow work, the machining accuracy cannot be improved even with the use of this control system.

Thus, when making an attempt to perform backlash correction inclusive of the amount of work deflection, the deflection of the work has to be corrected by finding the amount of correction for every machining shape since the amount of deflection varies depending on the machining shape.

For instance, in the case where the same work (a hollow work) is machined to have a machining shape 1 and a machining shape 2, the amount of backlash correction has to be changed for every machining shape in order to reduce a shape error with the amount of backlash correction inclusive of the amount of correction for deflection of the work by using the backlash correction method of the prior art. If correction is performed on condition that the amount of backlash correction is changed for every machining shape, it is necessary to change the amount of correction to a new correction value after the direction of movement has been adjusted so that the total sum of the amounts of correction performed up to that point always comes to "0". If the amount of correction is changed on condition that the total sum of the amounts of correction is not "0", the commanded position differs from the actual position by a difference between the amount of correction before being changed and the amount of correction after having been changed.

Figure 10:
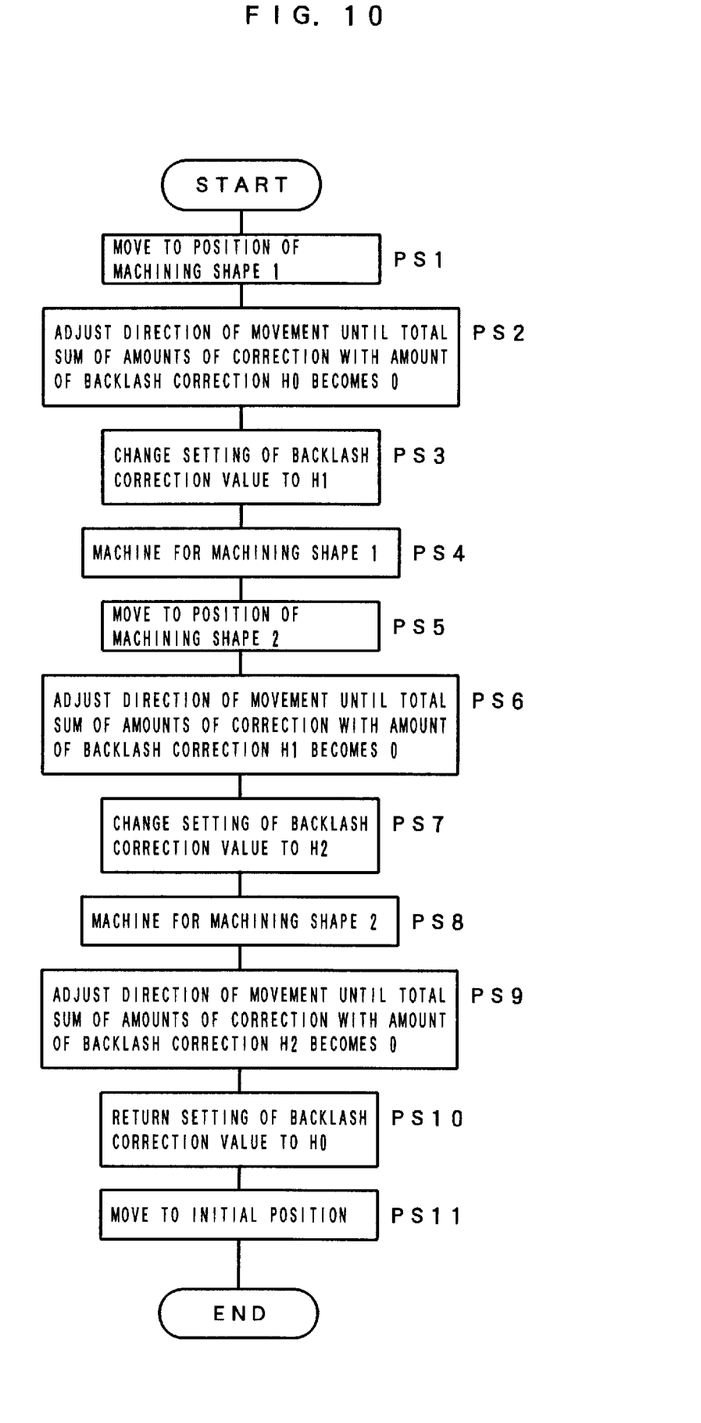
FIG. 10 is a flow chart showing the procedure of creating a machining program to correct a positional difference by a backlash correction method of a prior art when the positional difference varies depending on a machining shape.

FIG. 10 shows a procedure for creating a program in which backlash correction is performed with the amount of backlash correction inclusive of the amount of deflection of the work by using the backlash correction method of the prior art.

First as for the machining shapes 1 and 2, amounts of difference H1 and H2 between the commanded positions and the shape positions of the work resulting from reversing the direction of movement are measured in advance. Then, a program for the movement to the position of the machining shape 1 is created (Program Step PS1). Subsequently, adjustment of the direction of movement is programmed so that the total sum of the amounts of correction by the amount of backlash correction H0 (this amount of backlash correction H0 corresponds to backlash and means a normal amount of backlash correction not including deflection or the like of the work) comes to "0" (Program Step PS2). In this method, to adjust the direction of movement, a positive amount of correction is added to the move command when the direction of movement is reversed from the negative direction to the positive direction or a negative amount of correction is added to the move command when the direction of movement is reversed from the positive direction to the negative direction, and thus the total sum of the amounts of correction does not become "0" unless the direction of movement is reversed even number of times. Thus, the adjustment of the direction of movement is programmed so that the direction of final movement is adjusted before a change of the amount of correction so as to achieve correction of even-numbered times.

Then, an amount of correction H1 for the machining shape 1 is programmed as an amount of backlash correction, and a machining program to machine the work into the machining shape 1 is created (Program Steps PS3 and PS4). Subsequently, movement to the position of the machining shape 2 is programmed (Program Step PS5), adjustment of the direction of movement is programmed similarly to the Program Step PS2 so that the total sum of the amounts of backlash correction from the start of machining the work into the machining shape 1 to this point becomes "0", and a program for setting the amount of backlash correction 2 for the machining shape 2 is then created (Program Steps PS6 and PS7).

Then, a machining program to machine the work into the machining shape 2 is created, adjustment of the direction of movement is then programmed so that the amount of backlash correction becomes "0", the amount of backlash correction is returned to a normal value H0, and movement to the initial position is programmed (Program Steps PS8 to PS11).

As described above, in case of correcting the amount of correction effective in correcting also the amount of work deflection which varies depending on the machining shape by using the backlash correction method of the prior art, it is necessary to prepare an adjustment program which causes the total amounts of correction up to this point to be "0" before changing the amount of correction, with the result that there is a disadvantage of complicating creation of the machining program.

SUMMARY OF THE INVENTION

It is an object of the present invention to provide a move command correction method for correcting a move command (i.e., correction of a positional deviation) by adding an amount of positional difference resulting from reversing of the move command in a servo control system to the move command, as well as to provide a servo control system capable of correcting such a move command.

Another object of the present invention is to provide a move command correction method and a servo control system capable of correcting in a simple way a machining shape error caused by work deflection varying depending on the machining shape.

A further object of the present invention is to provide a move command correction method and a servo control system for positional correction which can be made in consideration of backlash and distortion of a ball screw or the like and deflection of a work.

According to move command correction of the present invention, an amount of difference between a commanded position and an actual position resulting from reversing of the direction of movement is found prior to machining; whether or not a sign of the move command is reversed in the process of machining according to a machining program is monitored; and the amount of difference is added to the move command to correct a move command value when reversion of the sign of the move command is detected. Then, the machining is performed on the basis of the corrected move command value.

According to the present invention, since the deflection of a work due to the reaction force of cutting is corrected in machining, it is possible to improve machining accuracy even for a work which is liable to be deflected by the action of cutting reaction force.

DESCRIPTION OF THE PREFERRED EMBODIMENTS

First of all, an outline of a servo control system according to one embodiment of the present invention will be described with reference to a functional block diagram of FIG. 1.

Figure 1:
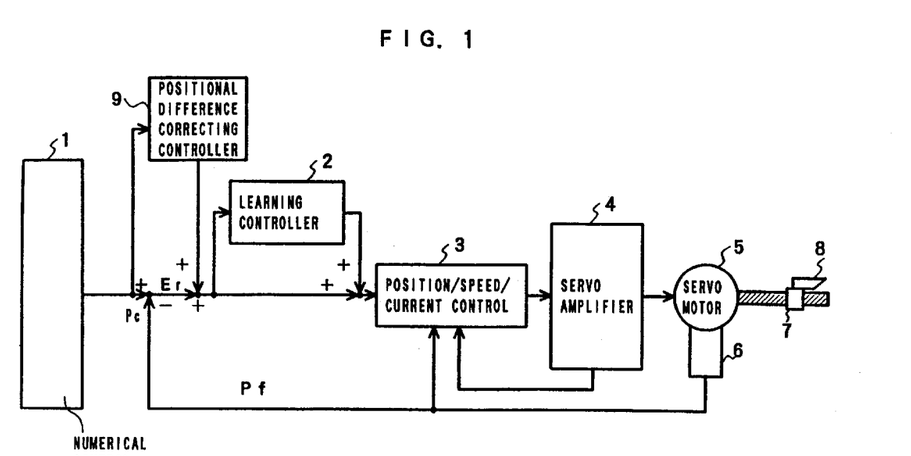
FIG. 1 is a functional block diagram showing a servo control system in one embodiment according to the present invention.

As is apparent by comparison with the servo control system in the semi-closed loop mode having the learning controller 2 of the prior art shown in FIG. 2, the features of a servo control system shown in FIG. 1 are to have a positional difference correcting controller 9 and to leave out correction of the amount of backlash correction 10.

When a move command Pc is issued from a numerical control device 1, a positional deviation is determined by subtracting an amount of positional feedback Pf from a position/speed detector 6 mounted on a servo motor 5 from the move command Pc. On the other hand, the positional difference correcting controller 9 fetches a first amount of correction from a memory of the positional difference correcting controller 9 and outputs the same when a sign of the move command Pc issued from the numerical control device 1 is reversed. The first amount of correction outputted from the positional difference correcting controller is added to the positional deviation. Further, the learning controller 2 performs learning control to output a second amount of correction. This second amount of correction is also added to the positional deviation to correct the positional deviation. The positional deviation corrected with the first and second amounts of correction in this manner are inputted into a position/speed/current control circuit 3. Incidentally, correction of the positional deviation with the amount of correction is equivalent to correction of a position command with the same amount of correction as the above amount of correction.

The position/speed/current control circuit 3 finds a speed command on the basis of the (corrected) positional deviation, then finds a torque (current) command through speed loop control performed on the basis of the speed command and an amount of speed feedback from the position/speed detector 6, controls driving of a servo motor 5 by controlling a servo amplifier 4 through current loop processing performed on the basis of the torque (current) command and a feedback value of drive current detected by a current detector (not shown) provided in the servo amplifier 4, and controls driving of a table or a tool 8.

A description will now be given of a function of the positional difference correcting controller 9 shown in FIG. 1 as one of the features of the present invention.

The positional difference correcting controller 9 monitors the move command Pc issued from the numerical control device 1 and outputs the first amount of correction, predetermined for every machining shape, according to a predetermined pattern, when a sign of the move command Pc is reversed, that is, a direction of movement of the servo motor (the table or cutting tool) as a command from the numerical control device 1 is reversed. The first amount of correction outputted from the positional difference correcting controller is added to the positional deviation to correct the positional deviation. Then, the corrected positional deviation is inputted into the position/speed/current controller 3, and further into the learning controller 2.

As described above, the first amount of correction as the output from the positional difference correcting controller 9 is added to the positional deviation. If the output (the first amount of correction) from the positional difference correcting controller 9 includes an amount of backlash correction, the amount of backlash correction is added to the positional deviation as a matter of course. However, adding the amount of backlash correction to the positional deviation and inputting the sum to the position/speed/ current controller 3 is equivalent to adding the amount of backlash correction to the position command and inputting the sum to the position/ speed/ current controller 3 (prior art). That is, when the output (the first amount of correction) from the positional difference correcting controller 9 includes the amount of backlash correction, backlash correction of the prior art can be effected by the positional difference correcting controller 9.

Figure 11:
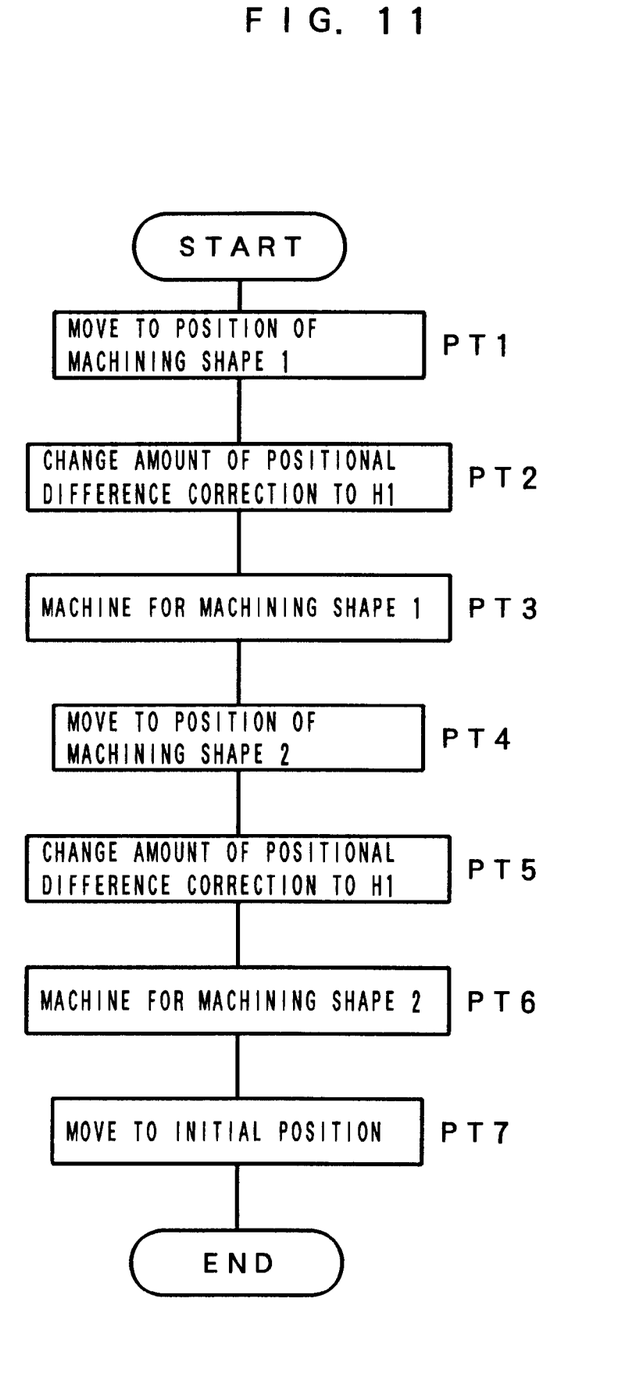
FIG. 11 is a flow chart showing the procedure of creating a machining program to correct a positional difference by a method of the present invention when the positional deviation varies depending on a machining shape.

Further, the correction by the positional difference correcting controller 9 is made only in the process of machining, and the total sum of the amounts of correction in the process of machining always comes to "0" (its details will be described infra). Accordingly, an optimum amount of correction easily be determined for each machining shape only by changing the amount of correction having been set up depending on a machining shape as shown in FIG. 11, which will be described infra, without complicating creation of the machining program as shown in FIG. 10, for instance.

A description will now be given of an essential part of a servo control system in a machine tool effective in performing a position correction method of the present invention with reference to a block diagram of FIG. 4.

The numerical control device 1 controls a machine tool. A shared memory 21 receives various commands or the like issued from the numerical control device 1 to the servo motor 5 and transfers the received commands to a processor of a digital servo circuit 22. The digital servo circuit 22 is composed of a processor (CPU), a ROM and a RAM or the like.

The processor of the digital servo circuit 22 not only controls the position, speed and current or the like of the servo motor 5 and but also performs learning control processing and the control of positional difference correction, which is a feature of the present invention. That is, the processor of the digital servo circuit 22 performs the processing of the learning controller 2, the position/speed/ current controller 3 and the positional difference correcting controller 9 shown in FIG. 1.

The servo motor 5 is controlled by the servo amplifier 4, composed of a transistor inverter or the like, and converts a revolving motion into a linear motion through a ball screw/nut mechanism 7 to drive the table or the tool 8 as shown in FIG. 1. The rotation position and speed of the servo motor 5 are detected by a pulse coder 6 and are then fed back to the digital servo circuit 22.

Figure 4:
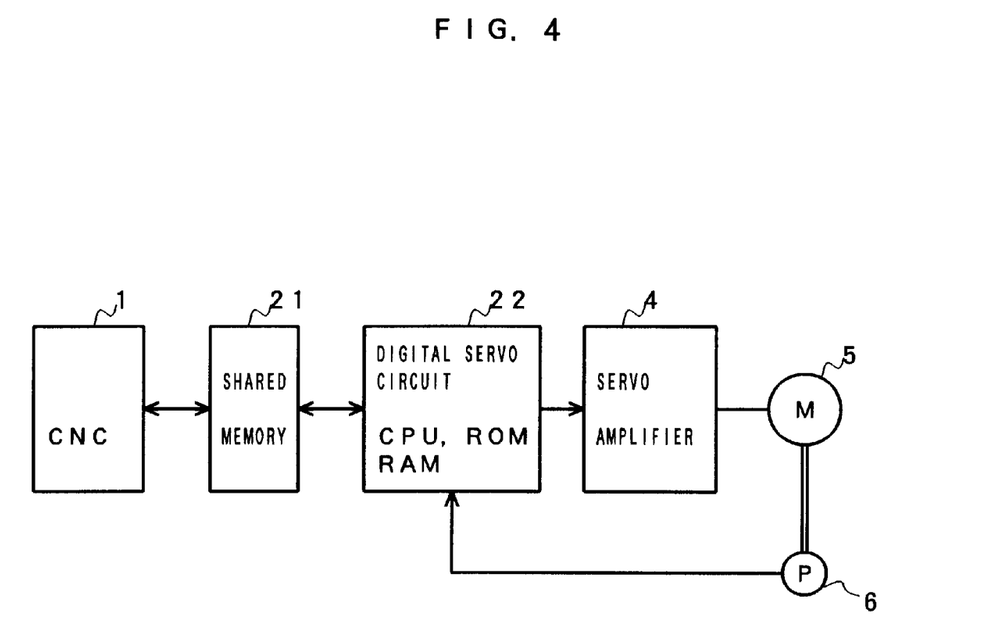
FIG. 4 is a block diagram showing a servo motor control system in one embodiment of the present invention.

The servo control system shown in FIG. 4 is different from that of the prior art in that the processor of the digital servo circuit 22 performs positional difference correction in addition to learning control.

A description will now be given of a position correction method according to one embodiment of the present invention.

First, trial cutting is performed without backlash correction, and an amount of difference between the commanded position and the actual position is measured for each machining shape when a direction of movement is reversed. Then, an amount of positional difference correction is set up in a machining program for each machining shape on the basis of the measured amount of difference (incidentally, the amount of positional difference correction varies depending on a correction pattern for positional difference correction as described infra).

A description will now be given of the procedure of creating the machining program required for machining a work to have two machining shapes (i.e., which will be referred to as a machining shape 1 and a machining shape 2) with reference to FIG. 11.

Movement to the position of the machining shape 1 is programmed (Program Step PT1), an amount of positional difference correction H1 obtained on the basis of the measured amount of difference with respect to the machining shape 1 is programmed (Program Step PT2), a machining program of the machining shape 1 is created, and then, a command to move to the position of the machining shape 2 is programmed (Program Steps PT3 and PT4). Subsequently, an amount of positional difference correction H2 on the basis of the measured amount of difference with respect to the machining shape 2 is programmed, a machining program of the machining shape 2 is created, and thereafter, a command to return to the initial position is programmed (Program Steps PT5 to PT7).

The procedure of programming shown in FIG. 11 has on advantage in that there is no need of steps for making "0" a total sum of the amounts of backlash correction before starting the machining for each machining shape (i.e., Program Steps PS2, PS6 and PS9 in the procedure of programming by the prior art shown in FIG. 10).

When the machining program created in this manner is loaded in the numerical control device 1 and executed, the processor of the numerical control device 1 reads out the program containing the predetermined amount of positional difference correction (Program Steps PT2 and PT5) with respect to the machining shapes 1 and 2 and then writes the read-out amount of positional difference correction into the shared memory 21, and the processor of the digital servo circuit 22 performs positional difference correction, which will be described infra, on the basis of the written amount of positional difference correction when the direction of movement is reversed.

As described above, since the amount of positional difference correction is obtained through actual measurement, the amount including backlash in a transmitting mechanism such as a ball screw, positional difference caused by distortion or deflection of the transmitting mechanism and the amount of deflection of the work by the action of cutting pressure is given as the amount of positional difference correction. That is, the amount of positional difference correction is provided as a value including the positional difference occurring by various causes resulting from reversing the direction of movement.

Further, a plurality of correction patterns are provided to correct the amount of correction according to the machining shape, material of the work or the like, and, for the present embodiment, two correction patterns (that is, the machining shape 1 and the machining shape 2), either of which may be selectable, and made available. Then, a plurality of correction patterns are set in the numerical control device 1 before the start of machining, and an amount of correction and the number of times of correction corresponding to each set pattern are set in advance.

A description will now be given of positional difference correction in the processing performed by the processor of the digital servo circuit 22 for each position/speed loop processing cycle with reference to flow charts in FIGS. 5 and 6. In these flow charts, since the position/speed loop processing and learning control processing performed by this processor are similar to those of the prior art, a description thereof is omitted, and only the processing related to positional difference correction as a feature of the present invention is shown.

When operation is started, the numerical control device 1 sets a flag F0, which is provided in the shared memory 12 to indicate that the machining is in progress, to "1" during the output of a cutting command (for instance, a machining command such as a code G01 indicating a linear cutting feed), or sets the flag F0 to "0" when the machining is not in progress (i.e., when a command relating to machining is not issued).

Then, the processor of the digital servo circuit 13 reads the flag F0 to check whether the machining is in progress or not (Step S1). When the machining is not progress, the processor finds a new positional deviation (Step S15) by subtracting a value in a register ALL stored with the total sum of the amounts of correction at reversion of direction from an error register stored with a positional deviation Er. Incidentally, the register ALL is set to "0" in the stage of initialization when the power is turned on, and thus its initial value is "0". Subsequently, the processor sets this register All to "0" (Step S16), sets a flag F1 to "0", which indicates that positional difference correction at the time of reversion of the direction of movement is in progress (Step S17), checks whether or not the move command is "0" (Step S13) and ends positional difference correction for the present cycle when the move command is "0". When the move command is not "0", the processor stores a sign of the move command in a register OLD (Step S14), and ends positional difference correction for the current cycle.

On the other hand, when the cutting command is issued from the numerical control device 1 and the flag F0 indicating that the machining is in progress is set to "1" (Step S1), the processor checks whether or not the move command is "0" (Step S2), and the processing proceeds to Step S5 when the move command is "0", whereas, when the move command is not "0", the processor compares the sign of the move command stored in the register OLD (in Step S14) for a cycle immediately before the current cycle with the sign of the move command for the current cycle and checks whether or not the sign is reversed (Step S3). When the sign is not reversed, the processing proceeds to Step S5, whereas, when the reversal of the sign is detected, this means that the direction of movement up to this point is reversed by a given move command. Thus, the processor sets the flag F1 to "1" for indicating that processing for positional difference correction for backlash, distortion of the ball screw and deflection of the work or the like is in progress, sets a counter i, which counts the number of times of correction, to "0", stores the present move command in a register M1, which holds the move command at the time of reversion for checking the direction of correction (Step S4), and processing proceeds the to Step S5.

In Step S5, the processor checks whether or not the flag F1 for indicating that the positional difference correction at the time of reversion of the direction of movement is in progress is set to "1". This flag F1 is set to "0" in the stage of initialization, and thus its initial value is "0". Further, this flag F1 is also set to "0" when the machining is not in progress. When the flag F1 is "0", the processing for correction at the time of reversal of direction is not performed but whether or not the current move command is "0" is determined (Step S13), and ends positional difference correction for the current cycle when this move command is "0". When the move command is not "0", the processor stores the sign of the move command in the register OLD (Step S14), and ends the processing for the current cycle.

On the other hand, when the flag F1 indicating that positional difference correction at the time of reversion of the direction of movement is in progress is "1" in Step S5, the processor starts calculation of correction patterns (Step S6).

This embodiment enables selection from two correction patterns.

According to the pattern 1, the predetermined amount of correction is divided by the predetermined number of times, and the divided amount of correction is corrected predetermined number of times as the amount of correction for each cycle of position/speed processing. Thus, the amount of correction is outputted equally the predetermined number of times for each position/speed processing cycle.

According to the pattern 2, the amount of correction of a large value is outputted in the first position/speed loop processing cycle and is then gradually decreased until "0" at the time when the amount of correction is outputted the predetermined number of times.

Then, the processor of the digital servo circuit 13 starts calculation of correction patterns in Step S6. That is, a sub-routine for the calculation of correction patterns shown in FIG. 6 is started.

First, the processor of the digital servo circuit checks whether the selected correction pattern is the pattern 1 or 2 (Step BS1). When the pattern 1 is selected, the processor divides the predetermined amount of correction written in the shared memory predetermined number of correction times, stores the quotient in a register R which stores correction value for the current cycle (Step BS2), increments an index 1 by "1" (Step BS4), checks whether or not a value of the index i is not less than the predetermined number of correction times (Step BS5), ends calculation of correction patterns for the current cycle and the-processing returns to the main processing when the value of the index i is equal to or less than the predetermined number of correction times. Further, when the index i is increased to a value not less than the predetermined number of correction times, the processor sets a flag F2 indicating completion of correction pattern calculation to "1" (Step BS6), and the processing returns to the main processing.

On the other hand, when it is decided in Step BS1 that the pattern 2 is selected, the processor subtracts a value resulting from dividing a value of the index i by the predetermined number of correction times from 1, multiplies the difference by the predetermined amount of correction, stores the product in the register R as a correction value for the current cycle (Step BS3), and the processing proceeds to Step BS4. As a result, since the value of the index i is "0" in the initial stage, then the predetermined value itself is given as the correction value in the current cycle, while in the subsequent cycles, the index i is incremented by "1" in Step BS4, and hence, a value decremented sequentially at a rate of (predetermined value/number of correction times) for every cycle is given as a correction value in that cycle, with the result that correction in the initial stage is performed with a large value, and subsequent correction is performed with a smaller value by degrees.

Returning to the main processing, the processor checks whether or not the move command M1 at the time of reversion is positive (Step S7), and, when positive, backlash correction has to be made in a positive direction, since the movement in a negative direction up to this point is changed to the movement in the positive direction by the positive move command at the time of reversion. Further, since the tool that has been moved in the negative direction up to this point is distorted in the positive direction by the effect of the force from the work in the positive direction. Thus, correction in the positive direction is required for eliminating the distortion of the tool. Further, since the work is deformed in the negative direction by the effect of cutting pressure of the tool in the negative direction, correction in the positive direction is required for eliminating the deformation. In this connection, when the direction of movement M1 at the time of reversion is determined to be positive in Step S7, the processor adapts the positive amount of correction, in which the correction value sign stored in the register in the current cycle is plus, for the amount of correction in the current cycle (Step S9).

Further, since the fact that the move command M1 at the time of reversion is determined to be negative in Step S7 means that the movement in the positive direction up to this point is changed to that in the negative direction by the negative move command for the current processing cycle, so that the sign of a value in the register R is negative to provide a negative amount of correction (Step S8), that is, to the state reverse to that described above.

Then, the processor adds this amount of correction to a positional deviation value Er (i.e., a value resulting from subtracting the amount of positional feedback Pf from the move command Pc) to correct the positional deviation value and also adds up the added amount of correction to the register ALL which stores the total amounts of correction in the process of machining (Step S10).

The correction value obtained through learning control is added to the corrected positional deviation value obtained in Step S10, and the corrected positional deviation value obtained by positional difference correction is further corrected. Then, a speed command is determined by multiplying a position loop gain by the corrected positional deviation value, obtained through positional difference correction and learning control, in the same member as the prior art; speed loop processing is performed on the basis of the speed command in the same manner as the prior art; current loop processing is further performed on the basis of the torque command (current command) obtained through the speed loop processing to supply current to each phase of the servo motor, and as a result, the servo motor 5 is driven.

Figure 5:
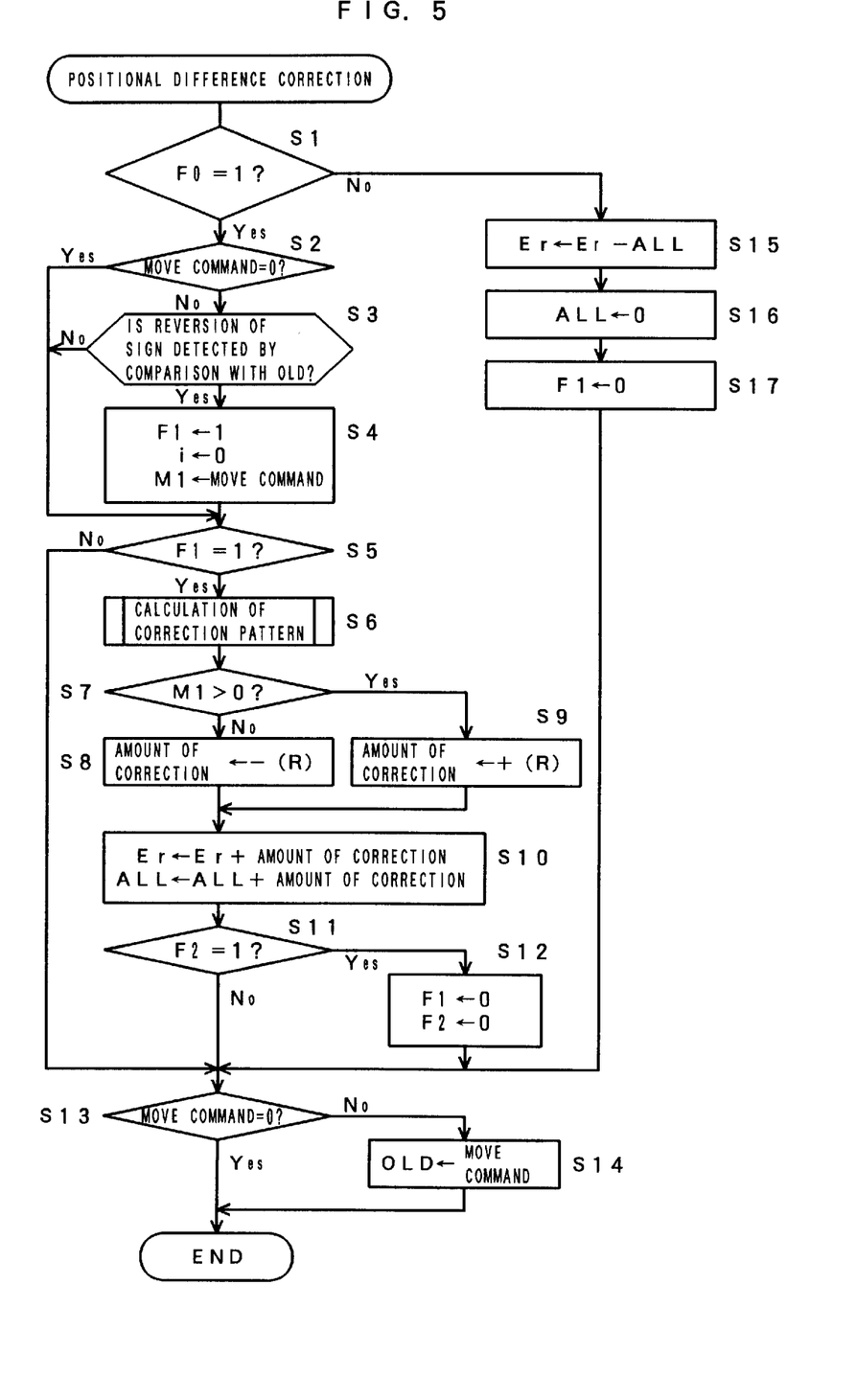
FIG. 5 is a flow chart showing the processing to correct a positional difference in one embodiment according to the present invention.
Figure 6:
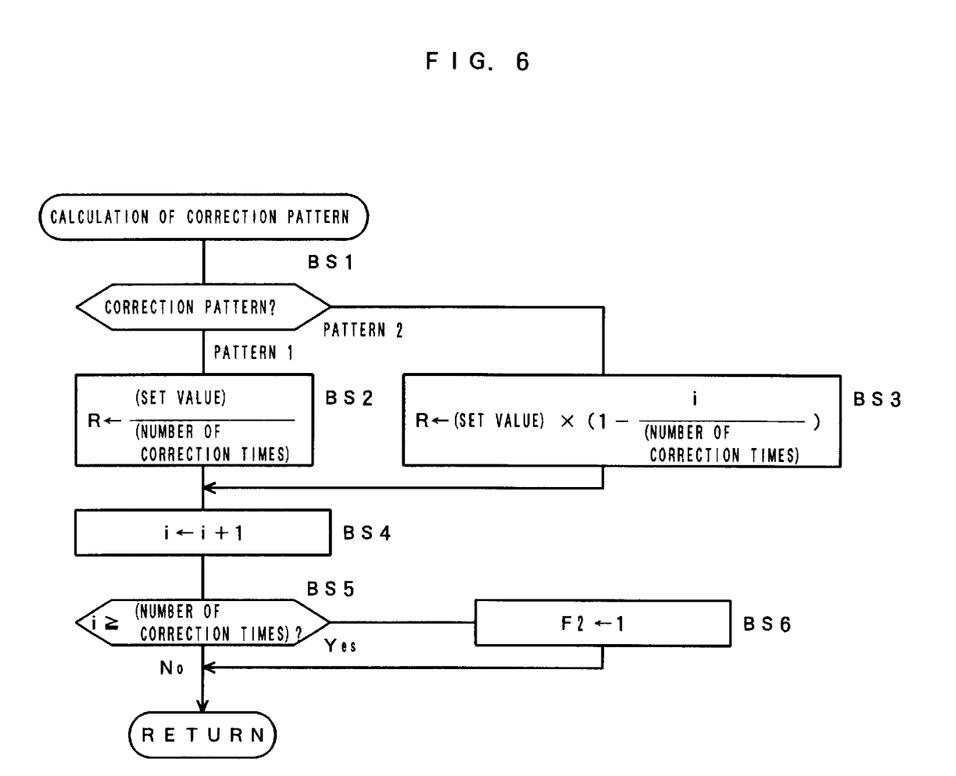
FIG. 6 is a flow chart showing the processing to calculate a correction pattern in the embodiment.

Incidentally, the processing to determine the positional deviation value by subtracting the amount of positional feedback Pf from the move command Pc, the processing to determine the speed command by multiplying the positional deviation by the positional loop again, the speed loop processing and the current loop processing are omitted from the flow chart shown in FIG. 5.

Subsequently, the processor checks whether or not the flag F2 is "1" and checks whether or not correction in reversion is ended (Step S11). When the flag F2 is "0", the correction at the time of reversion is not ended, and in this case, the processor checks whether or not the move command on this occasion is "0" (Step S13) and ends the processing for the current cycle when the move command is "0". When the move command is not "0", the processor stores the sign of the move command in the register OLD (Step S14) and ends the processing for the current cycle.

In the subsequent cycle, the processing proceeds to Steps S1, S2, S3 and S5 in this order and further from Step S5 to Step S6 to calculate the correction pattern (Step S6, the processing in FIG. 6) by reason that the flag F1 is set to "1" in Step S4 in the previous cycle. In this case, since the index i is incremented by "1" through the processing in Step BS4 in the previous cycle, a correction value smaller than the previous correction value by (amount of correction/number of correction times) is calculated (Step BS6) in the case where the correction pattern 2 has been selected. When the correction pattern 1 is selected, the correction value equal to the previous correction value is stored in the register R (Step BS2).

Then, the positional deviation is corrected with the calculated correction value obtained through the processing in Steps S7 to S10, and the correction value is added to the register ALL which stores the total amounts of correction in the process of machining.

In each of the cycles that follow, when it is detected that the value of the index i has become equal to or larger than the number of correction times while the processings in steps S1–S3 and S5–S14 are repeated, the Flag F2 is set to "1" (Step BS6), and the processing returns to the main processing. Then, the main processing proceeds form Step S1 to Step S12, and the flags F1 and F2 are set to "0". Then, it is determined whether or not the present move command is "0" (Step S13), and, when it is "0", the processing for the current cycle is brought to an end. When the move command is not "0", the processor stores the sign of the move command in the register OLD (Step S14) and ends the processing for the present cycle.

In the subsequent cycle, the processing proceeds to Steps S1 and S2 in this order and the processor checks whether or not the sign stored in the register OLD is different from the sign of the move command for the current cycle (Step S3), when the move command for the current cycle is not "0". When the signs are not different from each other, the processing proceeds to Step S5 and further from Step S5 to Step S13 by reason that the flag F1 is set to "0". When the move command in the current cycle is "0", the processor ends the processing as it is. When the move command is not "0", the processor performs the processing in Step S14 and ends the processing in the current cycle. In the following processing when the move command is not "0", and, as long as the flag F0 indicating that machining is in the process is "1", the processor performs the processing in Steps S1, S2 and S3 to check whether or not the sign of the move command is reversed, and then proceeds the processing to and after Step S4, as described above, when the reversion of the sign is detected, and performs processing of correction at the time of reversion in and after Step S5.

On the other hand, when the machining is ended and the flag F0 indicating that the machining is in progress is set to "0" by the processor of the numerical control device, the processor of the digital circuit 13 subtracts a cumulative value stored in the register ALL resulting from adding up the amounts of correction at the time of reversion during the machining from the positional deviation value Er (Step S15). Immediately after the subtraction, the processor resets the register ALL to "0" (Step S16). When the cumulative value resulting from adding up he amounts of correction in Step S10 in the process of machining is a positive value, for instance, it means that an extra move command is added by the amount of correction of the positive value caused by positional difference correction, in addition to the move command. Since the cumulative value of the amounts of correction in the process of machining is stored in the register ALL, subtraction of the value stored in the register ALL from the positional deviation at the end of machining results in canceling the move command issued in excess of the position command from the numerical control device. When the loop processing for the position, speed and current is performed on the basis of the positional deviation Er decreased by the value in the register ALL, the position of the servo motor 5 agrees with the position commanded by the program.

Figure 7:
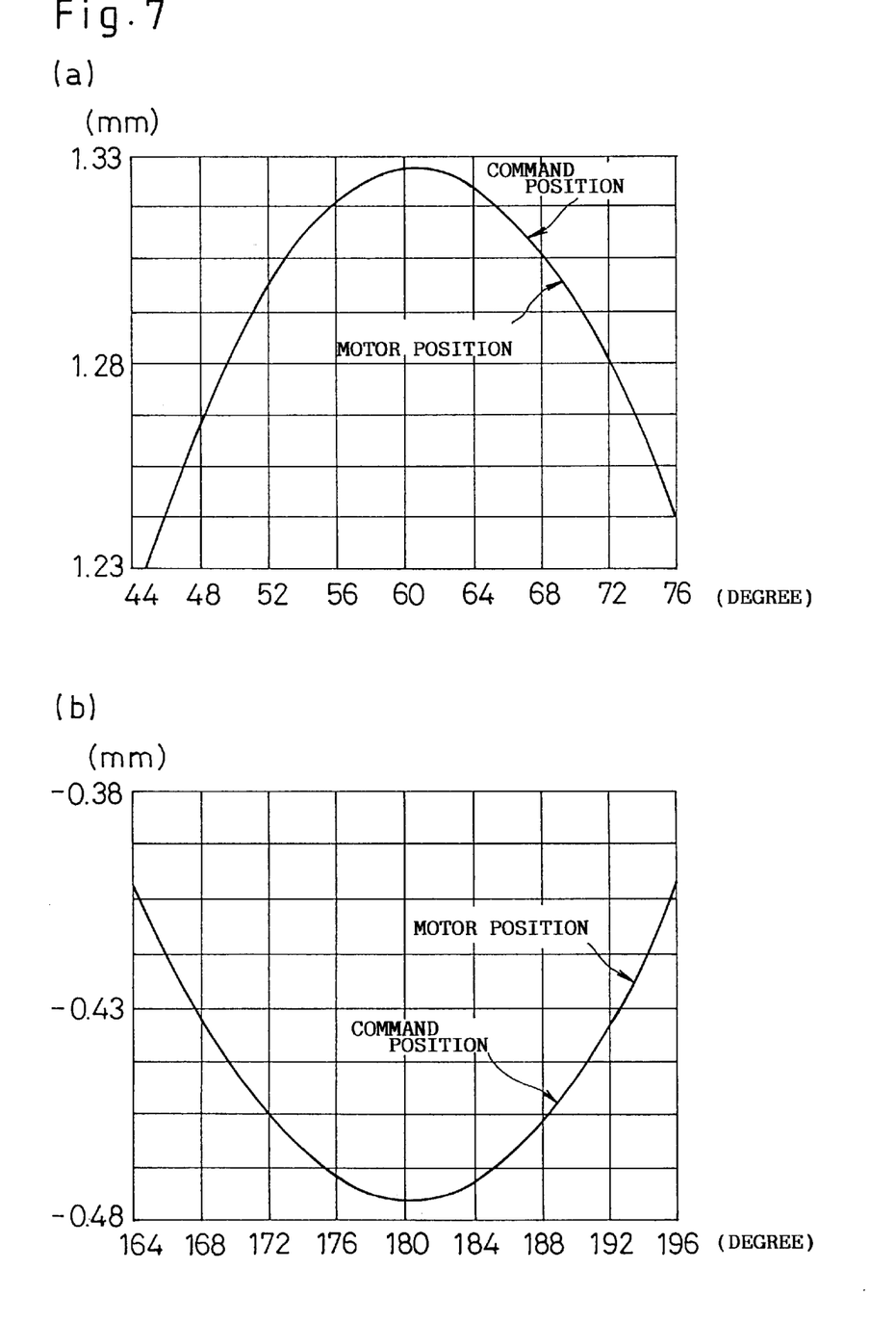
FIGS. 7 to 9 show a commanded position and a motor position before a positional difference is corrected in machining of a piston ring, respectively.
Figure 8:
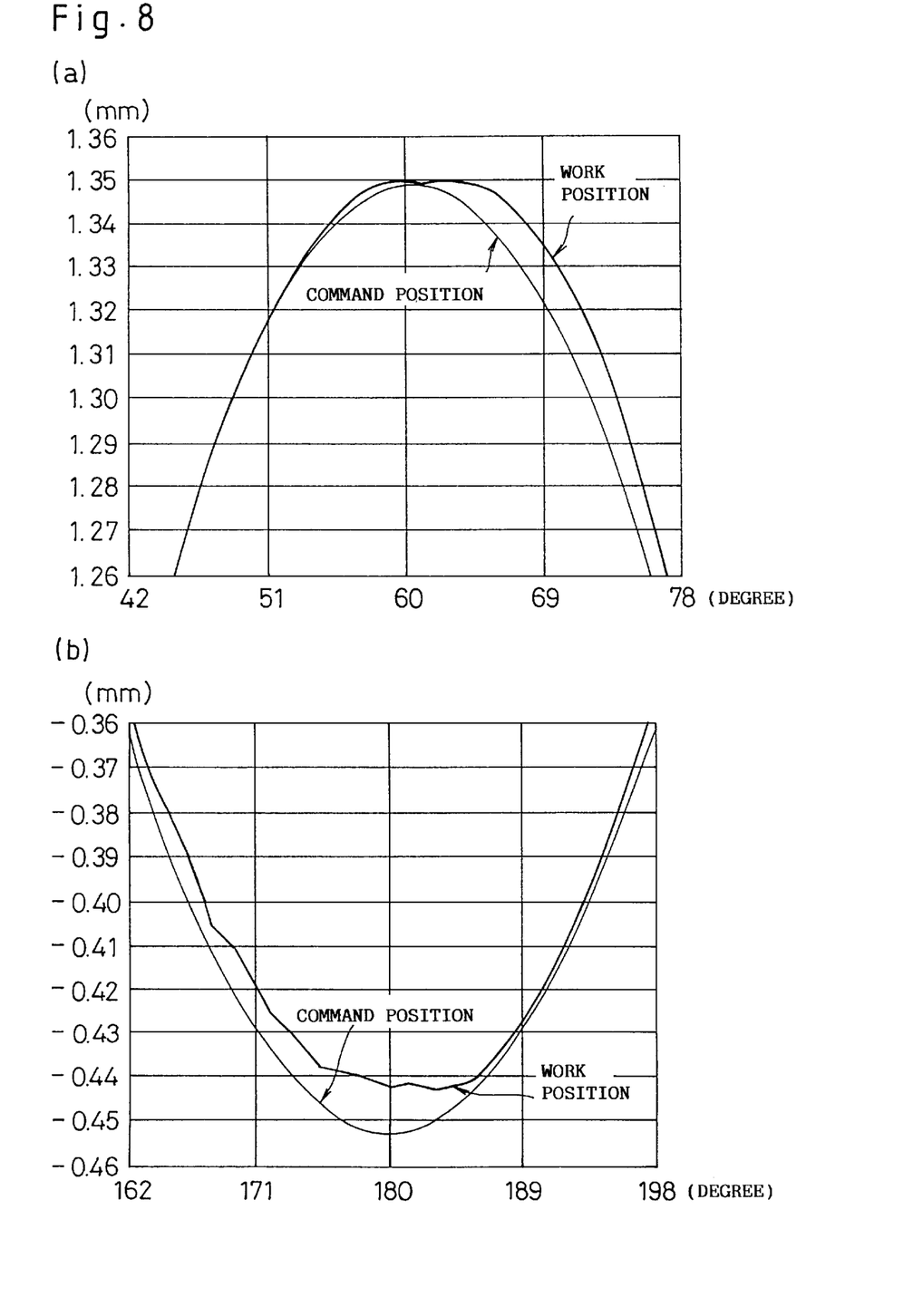
Figure 9:
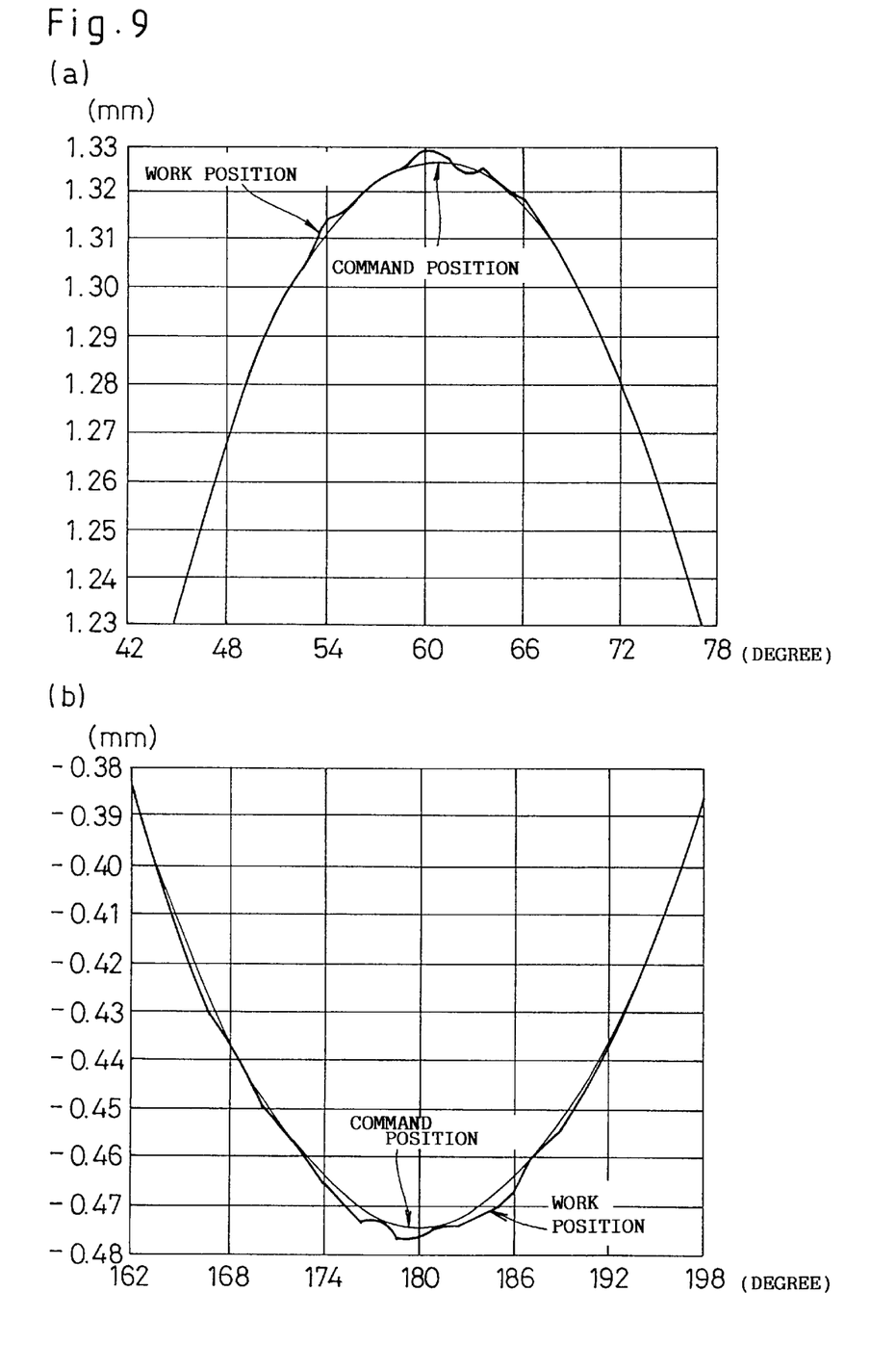

FIGS. 7, 8 and 9 show the results of experiment in a case of machining for a piston ring according to the method of the prior art and the method according to one embodiment of the present invention.

Since the piston ring is very thin, the work is deflected by the action of cutting pressure to degrade machining accuracy. The piston ring has a circular shape when fitted to a piston, while this piston ring is machined in the shape of a heart. Thus, when the work is cut by moving a tool axis (Y axis) while revolving the work, the direction of movement of the tool axis (Y axis) is reversed four times. FIGS. 7 to 9 show measured values of the commanded position, the motor position and the work position (a radial length) at the rotational positions 60° and 180° of the piston ring (in the shape of a heart) where reversion is caused. Referring to FIGS. 7 to 9, the axis of abscissa represents an angle, and the axis of ordinate represents a radial length.

FIG. 8 shows the commanded position and the work position (work shape) when machining the piston ring through learning control without backlash correction of the prior art nor positional difference correction according to the present invention. FIG. 7 shows the commanded position and the servo motor position in the above case. As seen form FIG. 7, since the learning control is performed, the commanded position agrees with the servo motor position. However, as the result of measurement of the machining shape of the work, it is found that a machining error as seen from FIG. 8. As shown in FIG. 8(a) in particular, the cutting pressure is low, and thus the work is less deflected during the movement of the cutting edge of the tool to escape from the work before reversion of direction (during the increase of a radius), resulting in a very small difference between the commanded position and the work position (work shape). However, after the reversion of direction as shown in FIG. 8(b), since the cutting edge of the tool is moved to thrust into the work (in the direction to reduce the radius), the work is deflected toward the center by the action of cutting pressure, it can be seen that the machining shape as commanded is not obtained due to restoration of this deflection after machining even if the cutting edge is moved along the commanded position.

FIG. 9 shows measured values of the commanded position and the work position in case of forming the piston ring by machining through positional difference correction according to the present invention after finding the amount of positional difference correction on the basis of the amount of difference between the commanded position and the work position (i.e., the amount of difference shown in FIG. 8) resulting from forming the piston ring by machining through learning control without backlash correction by the prior art nor positional difference correction according to the present invention. In this case, it can be seen that the position of the work almost agrees with the commanded position, indicating that machining accuracy is improved.

Incidentally, in the above embodiment, the amount of backlash correction is also included in the amount of positional difference correction obtained by the positional difference correcting controller 9. That is, in measuring or estimating the amount of positional difference correction for each machining shape, the difference between the commanded position and the work position resulting from machining without backlash correction by the prior art is measured or estimated, and the amount of positional difference correction is determined on the basis of the measured or estimated value. Then, in actual machining, only the positional difference correction is performed by the positional difference correcting controller without backlash correction by the prior art.

However, as shown in FIG. 2, the predetermined amount of backlash correction is added by the numerical control device 1 when the direction of movement is reversed. Thus, in case where the difference between the commanded position and the work position resulting from machining through backlash correction as described above is measured (or estimated), and the amount of positional difference correction by the positional difference correcting controller 9 is determined on the basis of the measured (or estimated) value, this amount of positional difference correction represents the backlash correction error at the time of reversing the direction of movement and the difference between the commanded position and the work position caused by the deflection of the work and the distortion of the machine. Then, in actual machining, the numerical control device 1 performs the backlash correction similar to that by the prior art, and the amount of correction predetermined for each machining shape is applied by the positional difference correcting controller 9.

What is claimed is:

1. A move command correction method, comprising:
   (a) finding an amount of difference between a commanded position and an actual position occurring at the time of reversion of a direction of movement, prior to machining;
   (b) monitoring whether or not a sign of a move command is reversed while the machining is in progress on the basis of a machining program;
   (c) correcting a move command value by adding the amount of difference found in (a) to the move command when the reversion of the sign of the move command is detected and adding up said amount of correction;
   (d) performing said machining on the basis of the move command value corrected in (c); and
   (e) outputting a value resulting from reversing a sign of the added-up value as the move command at the end of machining.

2. A move command correction method according to claim 1, wherein said machining program includes machining of a work into a plurality of machining shapes divided, so that the amount of difference is found for each machining shape in said (a), and the amount of difference corresponding to each machining shape is added to the move command for each machining shape in said (c).

3. A move command correction method according to claim 1, wherein correcting of the move command in said (c) is made each time the move command is outputted by repeating predetermined number of times the operation to add to the move command a correction value predetermined for each operation according to the amount of difference determined in said (c) and a predetermined distribution pattern.

4. A move command correction method according to claim 1, wherein said machining program includes repetitive machining in the same condition, whereby the move command value is corrected by adding also a correction value obtained through learning control to the move command value corrected in said (c).

5. A move command correction method according to claim 1, wherein the amount of difference in said (a) is obtained through trial machining.

6. A move command correction method according to claim 1, wherein the amount of difference in said (a) is obtained by estimation in consideration of backlash and deflection of a work by action of pressure of a cutting tool to a work.

7. A servo control system in which a move command is corrected, comprising:
   a numerical control device to issue a move command;
   a servo motor having a position/speed detector to drive a driven body;
   a servo amplifier having a current detector to control said servo motor;
   a position/speed/current control circuit to control said servo amplifier by finding a speed command from a positional deviation representing a difference between a position feedback outputted from the position/speed detector of said servo motor and a move command from said numerical control device, finding a torque command through speed loop control performed on the basis of said speed command and an amount of speed feedback from said position/speed detector, and performing current loop processing on the basis of the torque command and a feedback value of drive current detected by a current detector provided on said servo amplifier; and
   a positional difference correction controller to receive the move command from said numerical control device, while outputting a positional difference correction value required for correction of said positional deviation,
   wherein said positional difference correction controller includes a sign reversion monitor to monitor whether or not a sign of the move command inputted for the present process is different from a sign of the move command inputted on the previous process, a memory storing a predetermined positional difference correction value correspondingly to a machining shape, and a total correction amount memory storing the positional difference correction value added up in the process of machining each time said positional difference correction value is fetched from said memory; and
   said positional difference correction controller fetches the positional difference correction value corresponding to the machining shape from said memory and then outputs the fetched value so as to be added to said positional deviation, when said sign reversion monitor detects the reversion of the sign, and a value resulting from subtracting the added correction value stored in said total correction amount memory from the positional deviation for the present process is given as the positional deviation when machining is ended.

8. A servo control system in which a move command is corrected according to claim 7, further comprising a learning controller comprising a delay element memory storing the data for one cycle of the move command to be repeated by a predetermined cycle and the same pattern, and an dynamic characteristic compensation element;

wherein said learning controller is designed so that data resulting from adding the data stored in said delay element memory as the data preceding by one cycle to a current cycle to a positional difference undergoes filtering process and stored in said delay element memory, and the data preceding by one cycle is outputted from said delay element memory after having been subjected to compensation for the phase delay of a control object and the fall of gain with the dynamic characteristic compensation element, and the output data is added to said positional deviation to further correct said positional deviation.

9. A servo control system in which a move command is corrected according to claim 7, wherein said positional difference correction controller further includes determining the number of times, and the pattern by which positional difference correction value is outputted.

10. A move command correction method, comprising:

(a) finding an amount of difference between a commanded position and an actual position occurring at the time of reversion of a direction of movement, prior to machining;

(b) monitoring whether or not a sign of the move command is reversed while the machining is in progress on the basis of a machining program;

(c) correcting a move command value by adding the amount of difference found in the above (a) to the move command when the reversion of the sign of the move command is detected;

(d) performing a learning control on the basis of the move command corrected in the above (c) to correct further the move command; and (e) performing machining on the basis of the move command value corrected in the above (d).

11. A servo control system in which a move command is corrected, comprising:

a numerical control device to issue a move command;

a servo motor having a position/speed detector to drive a driven body;

a servo amplifier having a current detector to control said servo motor;

a position/speed/current control circuit to control said servo amplifier by finding a speed command from a positional deviation representing a difference between a position feedback outputted from the position/speed detector of said servo motor and a move command from said numerical control device, finding a torque command through speed loop control performed on the basis of said speed command and an amount of speed feedback from said position/speed detector, and performing current loop processing on the basis of the torque command and a feedback value of drive current detected by a current detector provided on said servo amplifier;

a positional difference correction controller to receive the move command from said numerical control device, while outputting a positional difference correction value required for correction of said positional deviation; and a learning controller, wherein said positional difference correction controller includes:

a sign reversion monitor to monitor whether or not a sign of the move command inputted for the present process is different from a sign of the move command inputted on the previous process;

a memory storing a predetermined positional difference correction value correspondingly to a machining shape, wherein said positional difference correction controller fetches the positional difference correction value corresponding to the machining shape from said memory and then outputs the fetched value so as to be added to said positional deviation, when said sign reversion monitor detects the reversion of the sign, and also said learning controller performs learning control on the basis of the move command corrected by the positional difference correction controller to correct further the move command, thus carrying out machining on the basis of thus corrected move command.

* * * * *